(12) United States Patent
Mosterman et al.

(10) Patent No.: US 7,496,895 B1
(45) Date of Patent: Feb. 24, 2009

(54) MULTI-DOMAIN UNIFIED DEBUGGER

(75) Inventors: Pieter J. Mosterman, Framingham, MA (US); Mehmet Yunt, Natick, MA (US); Murali Yeddanapudi, Watertown, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 539 days.

(21) Appl. No.: 11/025,218

(22) Filed: Dec. 29, 2004

(51) Int. Cl.
*G06F 9/44* (2006.01)

(52) U.S. Cl. .................. 717/124; 717/125; 717/126; 717/127

(58) Field of Classification Search ......... 717/124–136; 703/2
See application file for complete search history.

(56) References Cited

U.S. PATENT DOCUMENTS 6,853,963 B1 * 2/2005 Apfelbaum et al. ............ 703/2
7,043,415 B1 * 5/2006 Dunlavey et al. ............. 703/12
2003/0084127 A1 * 5/2003 Budhiraja et al. ........... 709/220
2004/0073413 A1 * 4/2004 Aberg et al. .................... 703/2
2004/0088678 A1 * 5/2004 Litoiu et al. ................ 717/104
2004/0172623 A1 * 9/2004 Eckels et al. ................ 717/125

* cited by examiner

*Primary Examiner*—Wei Y. Zhen
*Assistant Examiner*—Matthew J Brophy
(74) *Attorney, Agent, or Firm*—Lahive & Cockfield, LLP; Kevin J. Canning

(57) ABSTRACT

A Unified Debugger that enables the debugging of graphical models with combinations of entities from multiple domains such as time-based block diagrams, statecharts, and physical system models, with additional features for the debugging of hand-written and automatically generated code is disclosed. A view of the entity being executed that is consistent with the type of the modeling domain to which the entity currently being executed belongs is automatically generated for a user. Rather than requiring a user to manually transition from one debugger to the next, the Unified Debugger applies the appropriate debugging features from each modeling domain. The Unified Debugger also enables integration of diagnostic information from a multitude of modeling domains into a central user interface. In addition, a standard diagnostic interface which spans a plurality of modeling domains is defined that enables the customization of debug behavior.

48 Claims, 11 Drawing Sheets

```
Break Points | Simulation Loop

Method                                                    ID
⊞ sfcndemo_sfun_zc.Simulate                              1
  ⊞ sfcndemo_sfun_zc.Start                               7
  ⊞ sfcndemo_sfun_zc.Initialize.InvariantConstants       9
  ⊞ sfcndemo_sfun_zc.Enable.InvariantConstants           11
  ⊞ sfcndemo_sfun_zc.Output.InvariantConstants           13
    sfcndemo_sfun_zc.Initialize                          14
    sfcndemo_sfun_zc.Enable                              15
  ⊞ sfcndemo_sfun_zc.SimulationLoop                      16
    ⊞ sfcndemo_sfun_zc.Outputs.Major                     17
      ⊞ RootSystem.Outputs.Major                         18
          Sin.Outputs.Major                              19
          S-Function.Outputs.Major
                                          302
```

```
C/C++ | Simulink | SimMechanics | eML_Stateflow | M

68  /* Function : md1Outputs ==========================
69   * Abstract:
70   *    y = abs(u)
71   */
72  static void mdlOutputs (SimStruct *S, int_T tid)
73  {
●74    int_T
75     InputRealPtrsType    uPtrs   = ssGetInputPortRealSign;
76     real_T               *y      = ssGetOutputPortRealSign;
77     int_T                width   = ssGetOutputPortWidth(S);
78     int_T                *mode   = ssGetModeVector(S);
79
80     UNUSED_ARG (tid);  /* not used in single tasking mode
81
82     if (ssIsMajorTimeStep(S) ) {
83         for (i = 0; i < width; i++) {
84             mode[i] = (*uPtrs[i] >= 0.0);
85         }
86     }
87
88     for (i = 0; i < width; i++) {
89         y[i] = mode[i] ? (*uPtrs[i]) : -(*uPtrs[i]);
90     }
91  }
92
93
```

300

310

At break point 0 before 0:1 S-Function block methods 'sfcndemo_sfun_zc/Zero Crossing S-Function'
%-----------%                ] 0:1 S-Function.Outputs.Major 'sfcndemo_sfun_zc/Zero Crossing S-Function
[TM = 0
(sldebug @19)>>|

*Fig. 4B*

MULTI-DOMAIN UNIFIED DEBUGGER

FIELD OF THE INVENTION

The illustrative embodiment of the present invention relates generally to the debugging of executed block diagram models, and more particularly to the debugging of block diagram models containing entities from multiple types of modeling domains using a Unified Debugger.

BACKGROUND

Block diagrams are used to model real-world systems. Historically, engineers and scientists have utilized time-based block diagram models in numerous scientific areas such as Feedback Control Theory and Signal Processing to study, design, debug, and refine dynamic systems. Dynamic systems, which are characterized by the fact that their behaviors change over time, are representative of many real-world systems. A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), bio-chemical systems (gene expression, protein pathways), and weather and climate pattern systems. Examples of man-made or engineered dynamic systems include: a bouncing ball, a spring with a mass tied on an end, automobiles, airplanes, control systems in major appliances, communication networks, audio signal processing, nuclear reactors, and a stock market.

A block diagram model of a dynamic system is represented schematically as a collection of blocks interconnected by lines that represent signals. A signal represents the input and output of a dynamic system. Each block represents an elemental dynamic system. A line emanating at one block and terminating at another signifies that the output of the first block is an input to the second block. Each distinct input or output on a block is referred to as a port. Signals correspond to the time-varying quantities represented by each line connection and are assumed to have values at each time instant at which the connecting blocks are enabled. The source block of a signal writes to the signal at a given time instant when its system equations are solved. The destination blocks of this signal read from the signal when their system equations are being solved.

Time-based block diagram models may be thought of as relationships between signals and state variables representative of a dynamic system. The solution (computation of system response) of the model is obtained by evaluating these relationships over time. The time-based relationship may start at a user-specified "start time" and end at a user-specified "stop time", or the evaluations may continue indefinitely. Each evaluation of these relationships is part of a time step. Signals represent quantities that change over time, and these quantities are defined for all points in time between the block diagram's start and optional stop time. The relationships between signals and state variables are defined by sets of equations represented by blocks. These equations define a relationship between the input signals, output signals, state, and time.

It should be noted that the term "block diagram" as used herein is also used to refer to other graphical modeling formalisms. For instance, flow-charts are block diagrams of entities that are connected by relations. Flow-charts are used to capture process flow and are not generally suitable for describing dynamic system behavior. Data flow block diagrams are diagrams of entities with relations between them that describe a graphical programming paradigm where the availability of data is used to initiate the execution of blocks, where a block represents an operation and a line represents execution dependency describing the direction of data flowing between blocks. It will be appreciated that a block diagram model may include entities that are based on other modeling domains within the block diagram. A common characteristic among these various forms of block diagrams is that they define semantics on how to execute them.

As noted above, professionals from diverse areas such as engineering, science, education, and economics build computational models of dynamic systems in order to better understand system behavior as it changes with the progression of time. The computational models aid in building "better" systems, where "better" may be defined in terms of a variety of performance measures such as quality, time-to-market, cost, speed, size, power consumption, robustness, etc. The computational models also aid in analyzing, debugging and repairing existing systems (be it the human body or the anti-lock braking system in a car). As systems become more complex, an increasingly large amount of time and effort is involved in creating accurate, detailed models. These models are typically hybrid dynamic systems that span a variety of domains, including continuous dynamics and discrete behavior, physical connections, and event-driven states. To add to the complexity, these systems may be depicted in a number of ways, including dynamic or physics block diagrams, finite state machines, and hand-written or automatically generated computer code.

To identify a cause when a model does not execute as expected, or when its execution time needs to be improved, detailed information about its execution has to be available. Unfortunately, this level of detail is not usually available as the display and the accessibility of such detailed information introduces significant execution overhead. Instead, the model can be run in a distinct 'debug' mode, where the additional information is exposed, but at the cost of execution speed. In order to debug the system behavior, the modeler must not only understand the inner workings of each piece of a model, but also how these different pieces interact. For example, the dynamic model could cause a transition in the finite state machine, or part of the dynamic system may be implemented in computer code, which is simulated in conjunction with the remainder that is modeled in the block diagram.

Currently, debugging tools exist that allow modelers to debug individual portions of their model from different modeling domains. Individual existing debuggers can walk the user through a dynamic block diagram, or show the transition order in a finite state machine, or step through running computer code. Unfortunately, the individual debuggers do not work together as a seamlessly integrated tool over multiple domains. This presents a number of problems. The modeler has to manually transition from one debugger to the next, losing the context of where they are in their system. Additionally, conventional debuggers provide no information about how the different domains of the system work together.

BRIEF SUMMARY

The illustrative embodiment of the present invention provides a multi-domain Unified Debugger that enables the debugging of graphical models with combinations of entities from multiple domains such as time-based block diagrams, statecharts, and physical system models, with additional features for the debugging of hand-written and automatically generated code. A view of the entity being executed that is consistent with the type of the modeling domain to which the entity currently being executed belongs is automatically generated for a user. Rather than requiring a user to manually transition from one debugger to the next, the Unified Debugger applies the appropriate debugging features from each modeling domain. The Unified Debugger also enables integration of diagnostic information from a multitude of modeling domains into a central user interface. In addition, a standard diagnostic interface which spans a plurality of modeling domains is defined that enables the customization of debug behavior.

In one embodiment in a computational device, a system for debugging a multi-domain block diagram includes a plurality of Debuggable Objects based on entities found in a graphical model. Each of the Debuggable Objects includes a standard interface for multiple separate execution domains. The system also includes a Unified Debugger. The Unified Debugger integrates the multiple Debuggable Objects into a common diagnostic environment for a user.

In another embodiment in a computational device with a block diagram environment, a method of debugging a multi-domain block diagram includes the step of providing multiple Debuggable Objects (DBOs) associated with entities found in a block diagram model. The block diagram model includes entities from multiple types of modeling domains. Each of the DBOs includes a standard interface for the multiple modeling domains. The method also includes the step of providing a Unified Debugger that integrates multiple DBOs into a common diagnostic environment for a user. The common diagnostic environment displays multiple views of the block diagram to a user. The views are consistent with the modeling domain of an entity being executed. The method additionally includes the step of executing the block diagram. The Unified Debugger provides a view of the execution to the user.

In an embodiment, a distributed system for debugging multi-domain block diagrams includes a server hosting a block diagram environment with at least one block diagram model. The block diagram model includes entities from multiple modeling domains. The entities in the block diagram model are associated with multiple Debuggable Objects (DBOs). Each DBO includes a standard interface for the multiple modeling domains. The block diagram environment includes a Unified Debugger which integrates environments for debugging the multiple DBOs into a common diagnostic environment for a user. The common diagnostic environment generates multiple views of the block diagram to the user. The system also includes a client device in communication with the server over a network. The client device requests the initiation of an execution of the block diagram model in response to a user request. The system also includes a display device in communication with the client device. The display device displays the multiple views generated by the server during an execution of the block diagram model.

In another embodiment in a computational device with a graphical model execution environment, a medium holds computer-executable steps for a method of debugging a graphical model, the method includes the step of providing a model view of a graphical model being executed, the model view showing multiple entities from multiple execution domains. The method further includes the step of generating an execution list view of the entities in the model diagram. The method additionally includes the step of integrating the model view and the execution list view into a common diagnostic environment. The common diagnostic environment includes a unified debugger for the multiple execution domains.

In an embodiment, in a computational device with a graphical modeling environment, a method of debugging a multi-domain block diagram model includes the step of providing a standard interface for multiple entities found in a graphical model, the graphical model including entities from multiple different types of modeling domains. The method also includes the step of providing a unified debugger, the unified debugger integrating information acquired for debugging for the plurality of entities into a common diagnostic environment for a user. The debug information is acquired using the standard interface. The common diagnostic environment displays multiple views of the graphical model to a user consistent with the modeling domain of an entity being executed. The method additionally includes the step of executing the graphical model, the unified debugger providing a view of the execution to the user.

BRIEF DESCRIPTION OF THE DRAWINGS

FIG. 4B is a depiction of a user interface transitioned to by the illustrative embodiment of the present invention to present a model execution view and a source code model view for the model of FIG. 4A upon detecting an entity from a different modeling domain during an execution;

FIG. 5A and FIG. 5B depict the synchronization between views displayed by the Unified Debugger in the illustrative embodiment of the present invention, wherein FIG. 5A shows run-time debug information and FIG. 5B depicts the run-time debug information displayed on an associated entity in the block diagram model view;

DETAILED DESCRIPTION

The illustrative embodiment of the present invention provides a Unified Debugger that integrates debugging and diagnostic information from multiple modeling domains that are referenced by entities in a block diagram. The multiple modeling domains include time-based block diagrams, statecharts, data flow diagrams and compiled code. The Unified Debugging environment is able to display domain appropriate views to a user automatically based upon the entity in the block diagram being debugged. Additionally, a standard diagnostic interface embodied in a block diagram debuggable object is defined allowing access to information from the multiple types of modeling domains. The use of the standard diagnostic interface enables the customization of debug behavior at the block diagram functional level.

Figure 1A:
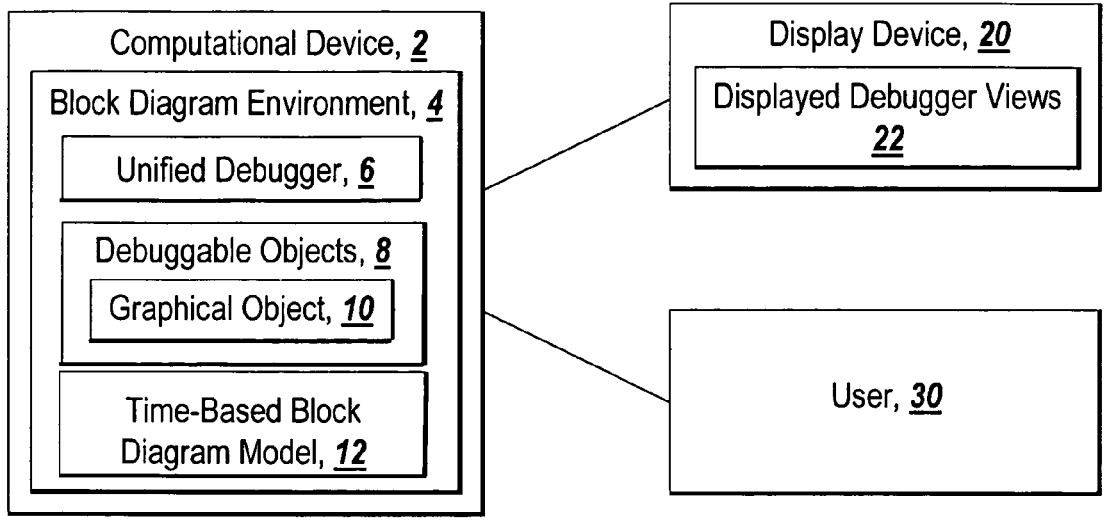
FIG. 1A is a block diagram of an environment suitable for practicing the illustrative embodiment of the present invention.

FIG. 1A depicts an environment suitable for practicing the illustrative embodiment of the present invention. A computational device 2 includes a graphical modeling environment such as the depicted block diagram environment 4. The computational device 2 may be a server, workstation, laptop, PDA or other device equipped with a processor and capable of supporting a graphical modeling environment. The block diagram environment 4, such as SIMULINK from The MathWorks, Inc. of Natick, Mass. or other graphical modeling environment, includes the Unified Debugger 6 of the present invention. The Unified Debugger 6 processes multiple Debuggable Objects 8. The Debuggable Objects 8 include one or more graphical objects 10. The Unified Debugger 6, Debuggable Block Diagram Objects 8 and graphical objects 10 are discussed in more detail further below. The block diagram environment 4 has access to at least one graphical model such as the depicted time-based block diagram model 12. The time-based block diagram model 12 includes entities from at least two modeling domains, such as entities from time-based block diagrams, statecharts, data flow diagrams and compiled code. The Unified Debugger 6 executes the time-based block diagram model 12 and generates displayed debugger views 22 on the display device 20. A user 30 views the display device 20 and accesses the computational device 2.

It should be understood that although FIG. 1A depicts a block diagram environment 4 and a time-based block diagram model 12 that includes entities from multiple different modeling domains, other implementations are possible within the scope of the illustrative embodiment of the present invention. For example, the Unified Debugger may be used in conjunction with a graphical model that is a state chart model that includes compiled code entities. Those skilled in the art will recognize that many other combinations of graphical models that include model entities from different domains are also possible within the scope of the present invention.

Figure 1B:
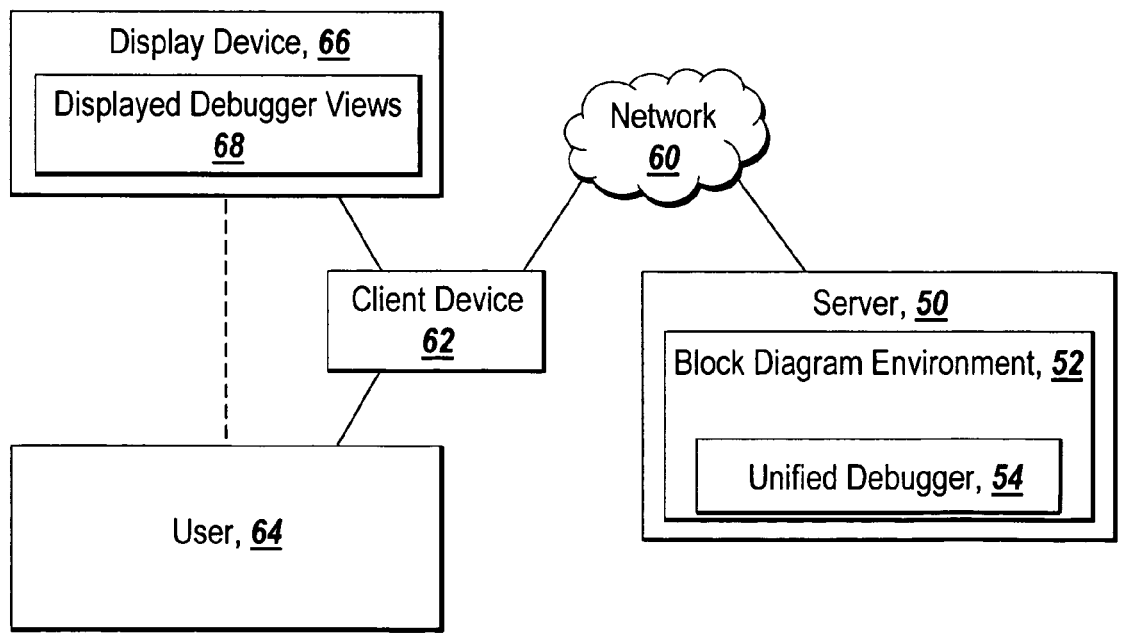
FIG. 1B is a block diagram of an alternative environment suitable for practicing the illustrative embodiment of the present invention.

The Unified Debugger of the present invention may also be implemented using a distributed architecture. FIG. 1B depicts an alternate distributed environment for practicing the illustrative embodiment of the present invention. A server 50 is interfaced with a network 60. The network 60 may be the Internet, an intranet, a local area network (LAN), a wide area network (WAN), or some other types of network. The server 50 hosts a graphical modeling environment such as the depicted block diagram environment 52 and the Unified Debugger 54 of the present invention. A client device 62 is in communication with a server 50 over a network 60. The client device 62 is in communication with a display device 66 upon which the displayed debugger views 68 that are generated by the Unified Debugger 54 are displayed. A user 64 is in contact with the client device 62 and views the display device 66. Those skilled in the art will recognize that other architectures may be utilized without departing from the scope of the present invention such as by retrieving the model being executed by the block diagram environment 52 from various locations accessible over the network 60.

The illustrative embodiment of the present invention includes two major elements. The Debuggable Object (DBO) 8 embodies the standard interface among the separate execution domains while the Unified Debugger integrates diagnostics and debugging functionality for a plurality of modeling domains and technologies. Execution of a graphical model can be done in the form of a simulation (such as normal or accelerated mode of simulation in SIMULINK) or in real-time in a test bed or in production environment (such as SIMULINK External Mode). The Unified Debugger requires a standard interface across all unified domains to be defined in order to enable cross-domain interaction and communication. The DBOs enable the Unified Debugger to function as if there is not a plurality of domains and entities but rather multiple standard objects. As a result, the Unified Debugger is only required to have the functionality to process DBOs and does not need to embody domain specific functionality.

A DBO encompasses a functional element in a block diagram execution such as (but not limited to) a block, a state machine, a mechanical machine or the algebraic and differential equation solver. All of the semantic elements of a block diagram and the execution engine can be represented as a DBO or multiple DBOs. The DBO also encompasses the graphical representation of the functional elements such as block icons on the block diagram or the display of integration information of the solvers on the debugger user interface.

DBOs implement certain capabilities and expose them to the Unified Debugger. One of the capabilities of the DBO is the registration of embodied methods with the Unified Debugger. A DBO has methods that are called during the execution of a block diagram. The Unified Debugger is informed of the available methods at the start of debugging to enable the user to set breakpoints on these methods. The registration functionality enables the DBO to inform the Unified Debugger of the plurality of available methods and enables the DBO to acquire identifiers to locate its methods in a master method list, which the Unified Debugger compiles at initialization of the debugging session. The DBO also acquires the necessary callback mechanism to inform the Unified Debugger of its currently executing method.

Figure 2A:
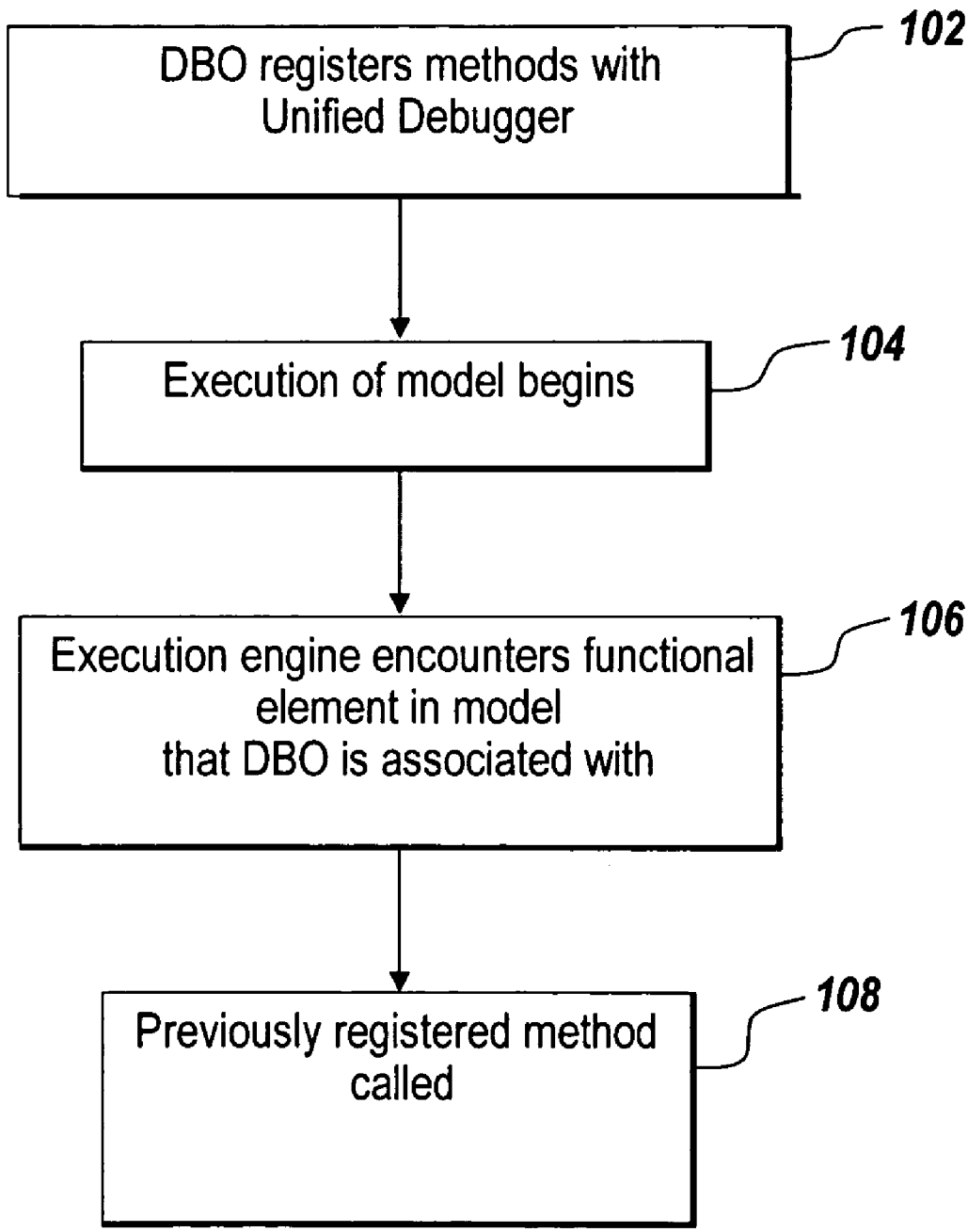
FIG. 2A is a flow chart of the steps followed by a DBO in the illustrative embodiment of the present invention to register methods with the Unified Debugger.

FIG. 2A depicts the sequence of steps followed by the illustrative embodiment of the present invention to utilize DBO methods. The sequence begins when the DBO registers methods with the Unified Debugger (step 102). Execution of the model then begins (step 104) and continues until the execution engine encounters a functional element in the model with which the DBO is associated and for which the DBO registered a method (step 106). The previously registered methods are then called by the Unified Debugger 6 (step 108). The registration of DBO methods with the Unified Debugger may also take place during run-time, such as during a break in execution of a model.

In addition to registering methods, the DBOs may also register domain specific execution events such as division by zero in the solvers, zero crossings, negative square roots and inconsistent state transitions. Each DBO needs to register such events with the Unified Debugger in order for the event to be exposed to the user. The registration functionality informs the Unified Debugger of the presence of an event and its name, in return the DBO acquires the means to inform the Unified Debugger to stop execution or perform another specified action in case of an event occurrence.

Figure 2B:
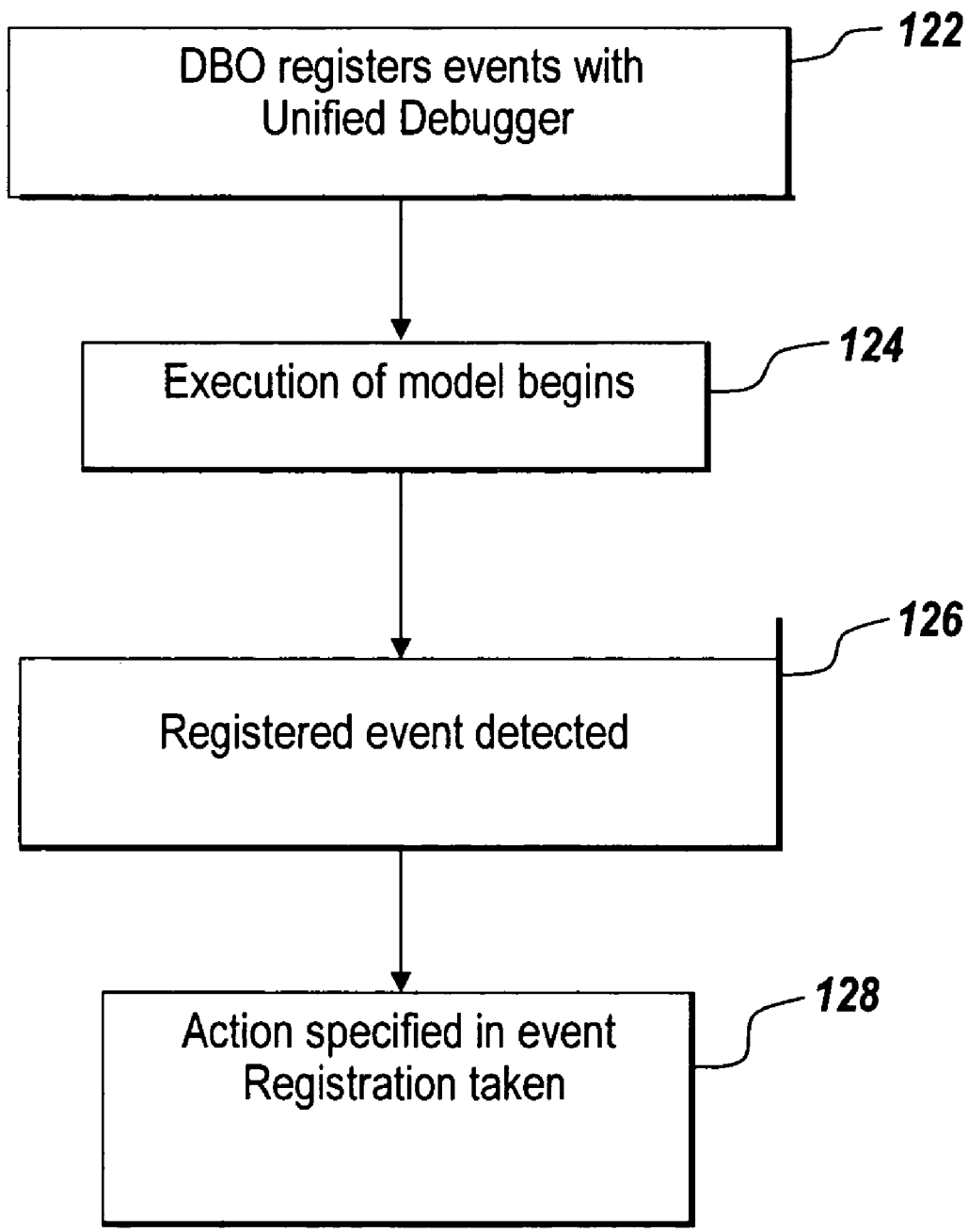
FIG. 2B is a flow chart of the steps followed by a DBO in the illustrative embodiment of the present invention to register events with the Unified Debugger.

FIG. 2B depicts the sequence of steps followed by which the DBOs of the illustrative embodiment of the present invention may utilize events to trigger actions during the execution of the model. The sequence begins when the DBO registers events with the Unified Debugger (step 122). Execution of the model then begins (step 124) and continues until a registered event is detected (step 126). The registered event may be the entry to, or exit from, a method. An action that was specified during the event registration is then performed (step 128). The registration of events with the Unified Debugger may also take place during run-time, such as during a break in execution of a model.

Similarly, the DBO can register commands specific to itself with the Unified Debugger. These commands appear on the user interfaces and become active as execution passes through the DBO. At the initialization of debugging, the commands are registered with the Unified Debugger. The commands are private functions of the DBO, and the Unified Debugger calls the DBO to execute the additional or the overridden commands.

The DBOs may also inform the Unified Debugger of a currently executing method: A DBO that contains at least one method informs the debugger of entry to and exit from that method. A method is any action of a DBO that has significance for the user and has a label. A method needs to have a well-defined exit and entry point. For instance, a transition from one state to another may be a method for a finite state machine. This functionality is implemented using the callback and identifiers acquired during the registration of available methods. A callback is called when the debugging engine during execution of the model encounters a functional element that includes a previously registered method.

Similarly, DBOs may include means to communicate via a protocol with the Unified Debugger and other DBOs. A DBO can communicate with other DBOs that are registered with the debugger. The DBO has the functionality to acquire access to the available DBOs and register itself with other DBOs to be called when certain events happen. For instance, the nonlinear solver used for algebraic loops in a time-based block diagram can call the ordinary differential equation solver in case the nonlinear solver is unable to find a solution to display solver information. In this example, the nonlinear solver and the ordinary differential equation are encompassed in separate DBOs. The registration of events and methods is also accomplished using the same communication means. The communication between the DBOs and the DBOs with the Debugger requires the definition of a message passing interface and a set of standard message constructs and a dictionary to be used. For the creation of message constructs, XML may be used.

The DBO is also responsible for exposing the data that the user can see. A DBO associated with an entity may display the output and input values, the DBO of a machine model may display the forces or accelerations. The Unified Debugger asks the DBO for data to be displayed and the DBO returns the data and how it should be displayed through the message passing interface. The DBO additionally determines how debug information is displayed on the model view and the Debugger User Interface. Each DBO has a schema file that may define the structure of the data, the types of data and the attributes of the data that the Debugger uploads at initialization or refers to when necessary. The DBO communicates to the Unified Debugger how and where on the UI debug information is supposed to be displayed.

In addition to the functionality discussed above, the DBOs may also have the properties of aggregation and inheritance. Thus, a DBO can include other DBOs. For instance, a DBO can be created for an algebraic loop in a time-based block diagram and it can include the DBOs of the blocks in the algebraic loop and the DBO of the nonlinear equation solver employed to solve the algebraic loop. The algebraic loop DBO is responsible for transmitting messages coming from the Debugger to its members and the messages from its members to the Debugger. Likewise, a DBO can inherit from one or multiple parents, properties and functionality. For example, the SIMULINK, STATEFLOW and SIMMECHANICS domains have DBOs that define the default behavior for any DBO in that domain. A child DBO can inherit the properties and functionality and then overwrite some or all of the default behavior to specify more specific behavior for the child DBO.

It should be noted that the inheritance hierarchy may be extended to include other domains because of the standardized Debuggable Object. Each of the domains customizes the object methods to be tailored to its debug requirements. The inheritance hierarchy allows more specific implementations by another level of inheritance to define detailed semantic elements within the SIMULINK domain such as blocks and the solver. For example, SIMULINK may implement a method to obtain the owner of a DBO, while the blocks and solver may specialize in highlighting its graphical object area. Furthermore, the graphical properties of DBOs can also be arranged in an inheritance hierarchy.

The default graphical properties of domains are specified by graphical objects for each domain (such as the SIMULINK, STATEFLOW and SIMMECHANICS domains which are all software packages available commercially from The MathWorks, Inc.) and other domains with discrete events and data flow. More specific display functionality is incorporated in the child objects. Inheritance allows the Unified Debugger to find subsets of DBOs to process. For example, in the situation where the Unified Debugger needs to set an option that controls the format of the numerical information displayed on all SIMULINK domain DBOs, an inheritance hierarchy allows the Unified Debugger to search for all DBOs that are SIMULINK DBOs and set the necessary format options.

It will be appreciated by those skilled in the art that although the illustrative embodiment of the present invention has been described as including the use of DBOs in an object-oriented environment, similar functionality may also be provided in non-object oriented environments. The provision of the common interface to multiple different modeling domains (that is provided by the DBOs of the present invention) using non-object-oriented data structures should be understood to be within the scope of the present invention. Similarly, the use of a Unified Debugger in a non-object oriented environment is also within the scope of the present invention.

Figure 3:
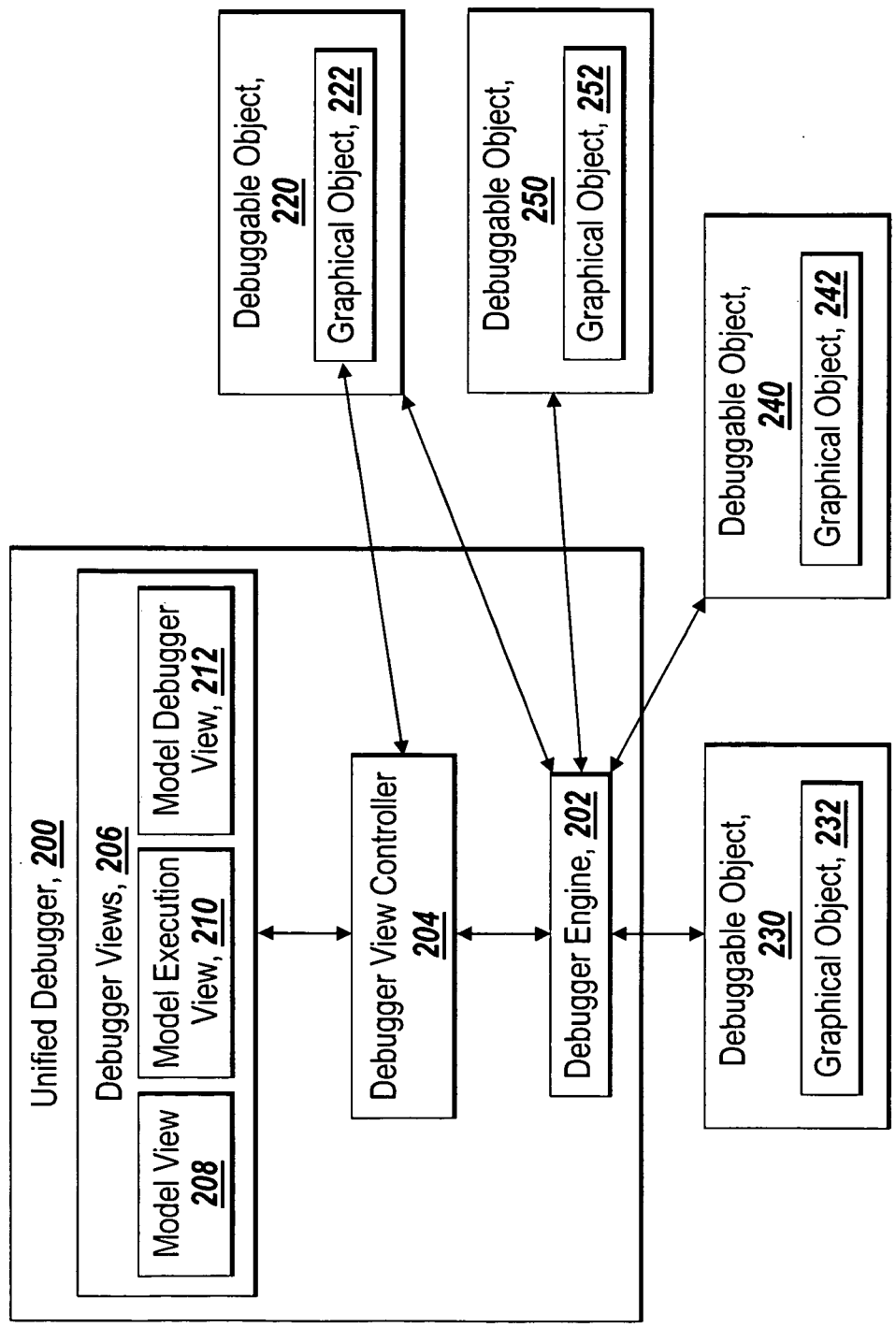
FIG. 3 is a block diagram of the Unified Debugger utilized by the illustrative embodiment of the present invention.

The Unified Debugger integrates the DBOs into a common diagnostic environment for the user. The Unified Debugger embodies the necessary functionality to process information coming from DBOs and relay information between DBOs and the graphical user interface elements. FIG. 3 depicts the Unified Debugger of the present invention. The Unified Debugger 200 includes a debugger engine 202, a debugger view controller 204 and a plurality of debugger views 206. The debugger views 206 may include but are not limited to a model view 208, a model execution view 210, and a model debugger view 212. The debugger view controller 204 determines how debug information is provided to a user and is in communication with the debugger engine 202. The Unified Debugger 200 processes a plurality of Debuggable Objects 220, 230, 240, and 250. In this case, each of the DBOs include graphical objects 222, 232, 242, and 252. The DBOs provide a standard interface to the Unified Debugger allowing cross-domain interaction and communication.

Examining the Unified Debugger 200 in more detail, the debugger engine 202 is responsible for communication with the DBOs 220, 230, 240 and 250. The DBOs 220, 230, 240 and 250 keep the Unified Debugger 200 informed of the progress of model execution by notifying the Unified Debugger of the entry and exit to a particular DBO method. The Debugger Engine is also responsible for relaying messages between DBOs that are not in the same aggregate DBO. A DBO sends a message to be posted to the Debugger Engine 202 which in return informs all other DBOs of this message. The posting DBO can also specify the type of DBO to which the message should be sent, in which case the Debugger Engine 202 sends the message to the DBOs of the selected type.

The Debugger Engine 202 is also responsible for relaying data requests from the Debugger View Controller 204 to the appropriate DBO. The Debugger Engine 202 also returns the requested data to the Debugger View Controller 204 from the DBO. The Debugger Engine 202 keeps a database of the methods that have executed in an order that preserves the call chain of each method. Additionally, the Debugger Engine 202 checks for interruptions to model execution such as break points, stores break points and events, and stores profiling information related to model execution.

The profiling information relates to the number of times a certain method has executed so far in a given execution cycle. The illustrative embodiment of the present invention allows this information to be obtained by keeping a counter for each method and showing it next to each method of the block diagram in a tree view or by displaying the value of the counter on a related block in the model (either as a number or by some other graphical means). The counter may be reset to 0 at the start of every major time step.

On the records for each unique method invocation the following profiling data may be stored:
1. The number of times a unique method invocation was invoked during model execution. This is a counter that is incremented every time the unique method invocation occurs.
2. The number of times a unique method invocation was executed per time step of a model execution. This is a counter that is incremented every time the unique method was invoked, but it is reset to zero at the start of each time step
3. The last time of entry to a unique method invocation. The debugger records the last time in the record of a unique method invocation before execution leaves the debugger and enters the execution engine.
4. The last time of exit from a unique method invocation. The debugger records the time the debugger is entered immediately after the method is executed.
5. The duration of method execution. This is the difference between time of last entry and last exit and is calculated immediately after last exit is recorded. This number can be the actual recent difference or an average of the past durations to accommodate any abnormal measurements.
6. The total duration of method execution. This record keeps the total time the execution engine spent executing this unique method invocation in real-time.

The profiling data that is collected may be further processed to calculate the following:
1. The total number of times a method of a certain owner has been executed: The unique method invocations are traversed and the total number of times recorded for each record that has the specified owner and method is summed. This information can be stored on the owner as a field as well.
2. The total of times a method of a certain owner has been executed in a time step: The unique method invocations are traversed and the total number of times per time step is recorded for each record that has the specified owner and the method is summed. This information is stored on the owner as a field as well.
3. The total duration over a time step for a method of a certain owner: The duration of execution for each record with the given method and owner are summed. This information is stored on the owner as a field as well.
4. The total duration for a method of a certain owner: The total duration of execution for each record with the given method and owner are summed. This information is stored on the owner as a field as well.

The Unified Debugger merges profiling information with debug information from a block diagram for display to a user The Debugger View Controller 204 determines how a DBO 220, 230, 240 and 250 will be represented in the Debugger Views 206 by merging the data from the DBO via the Debugger Engine 202 with the specifications and schema coming from the Graphical Objects of each DBO. The Debugger View Controller 204 collects the user-desired execution debug information such as information contained with DBOs 220, 230, 240 and 250 from the Debugger Engine 202. The Debugger View Controller is also responsible for automatically switching between different display modalities of different modeling domains such as block diagram displays, statecharts, C/C++ code, HDL and three dimensional display (virtual reality) environments as well as switching between the display of modeling technologies, such as block diagrams, C/C++ source code and/or M. It should be noted that the Debugger View Controller may also provide debug information to a user through a non-visual mechanism such as by using sound or tactile feedback.

As noted above, the illustrative embodiment of the present invention supports multiple views of the model information. The Debugger Views 206 are user interface elements that display debug information of the model and allow the user to interact with the Unified Debugger 200. The Debugger Views 206 include the Model View 208, the Model Execution View 210 and the Model Debugger View 212. Those skilled in the art will recognize that additional views displaying data relating to the model being executed may be provided without departing from the scope of the present invention. The Model View 208 is the user interface element that contains the graphical representation of the model. The Model Execution View 210 is an interface displaying information about the elements of a model. The Model Debugger View 212 is the interface where the main user input to the Unified Debugger is received.

Figure 4A:
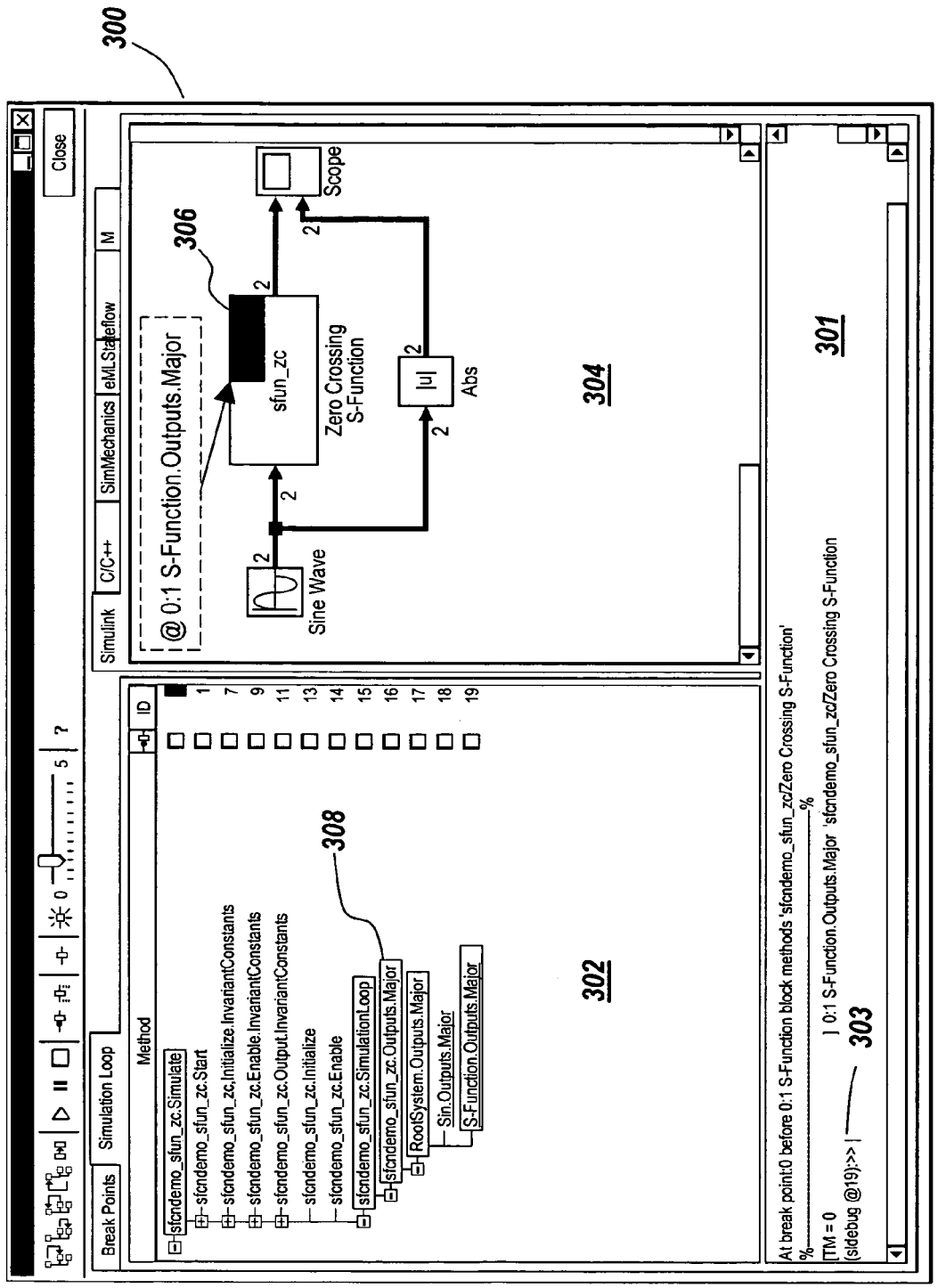
FIG. 4A is a depiction of a user interface employed by the illustrative embodiment of the present invention to present a model execution view and a block diagram model view.

FIG. 4A is a depiction of a user interface employed by the illustrative embodiment of the present invention to present a model execution view and a time-based block diagram model view. The display device 300 includes a model debugger view, 301, a model execution view 302, and a model view 304. The model debugger view 301 provides a command line 303 to accept user input. The model execution view 302 displays information about the elements of the time-based block diagram model such as the various methods that are currently being executed/simulated. The model view 304 is the user interface element that contains the graphical representation of the time-based block diagram. One of the entities in the model view 304 is an S-function block 306. The S-function block 306 includes the method outputs major 308 listed in the model execution view 302. Upon encountering the S-function block 306, the Unified Debugger consults the DBO and identifies that the S-function block contains code compiled in a debuggable form. The Unified Debugger automatically transitions the views displayed to the user to an alternate set of views depicted in FIG. 4B.

FIG. 4B includes the model execution view 302 and a source code view 310 representing the C/C++ source code of the S-function block 306. The Unified Debugger 200 includes the necessary features to continue execution of the source code without the user having to manually switch to a separate debugger for the C/C++ source code. Following the transition, the commands to step through the block methods that were being executed become commands to step through the source code that is displayed in the source code view 310 as long as the C/C++ source code view is the main view. The user has the option to switch back to other views including the SIMULINK block diagram model view 304 previously displayed in FIG. 4A. Once returning to the model view 304, the step command assumes the time-based block diagram functionality normally associated with a time-based block diagram view. Those skilled in the art will recognize that alternative views may be generated from other modeling domains such as by transitioning from a statechart view to a time-based block diagram view or vice versa.

Figure 4C:
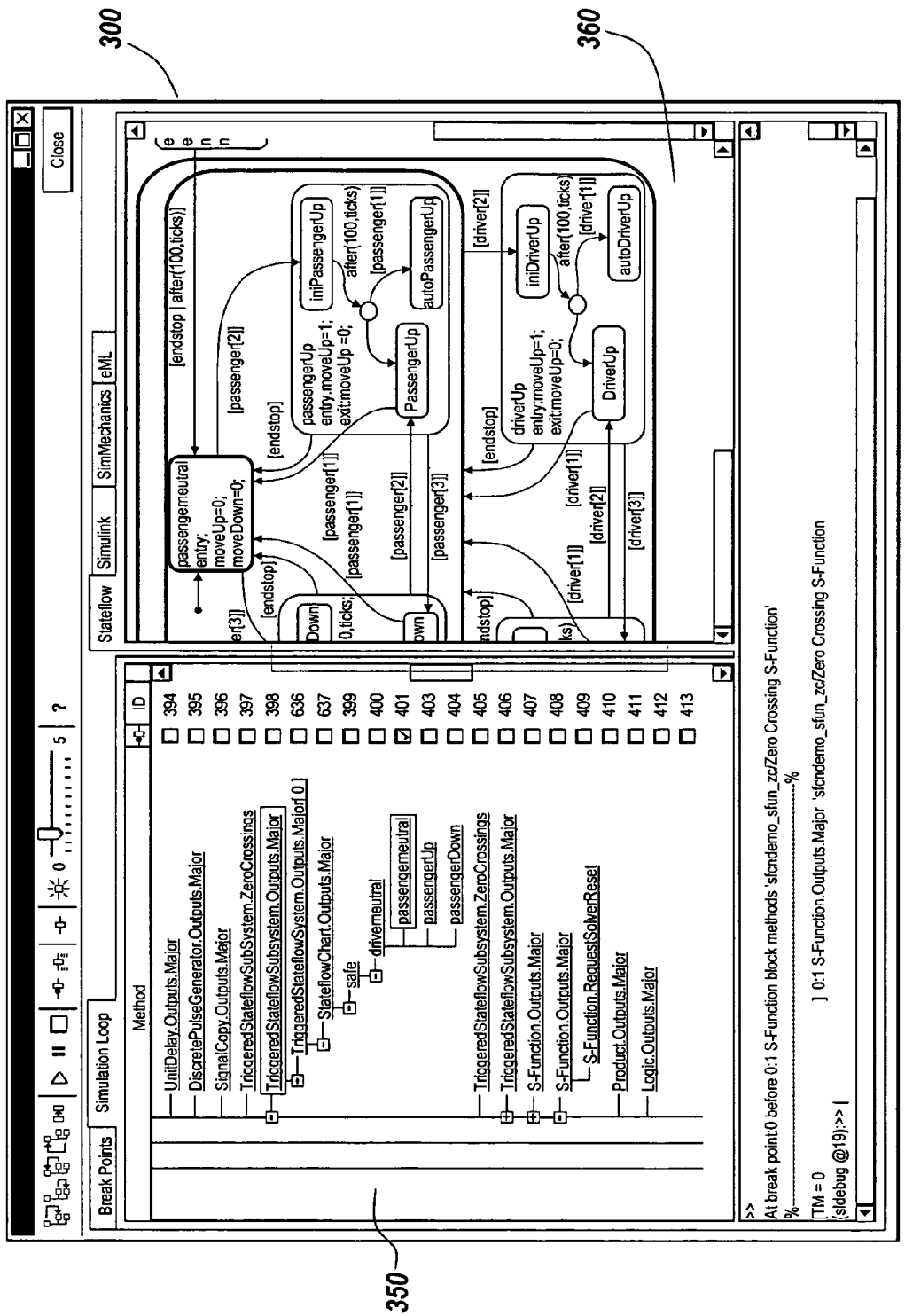
FIG. 4C is an alternative statechart view entered into by the illustrative embodiment of the present invention upon the execution entering a statechart entity in a block diagram.

An alternative view of a statechart modeling domain is depicted in FIG. 4C. FIG. 4C depicts a display device 300 showing an execution list view 350 and a statechart view 360. The execution list view 350 is arranged in a tree format and shows the methods called during model execution. A time-based block diagram view may be automatically switched by the Unified Debugger 200 to the statechart view 360 (depicted here as a STATEFLOW view) upon entering a statechart entity represented by a DBO in a time-based block diagram model. The properties of the view are customized for the particular modeling domain. Thus, in FIG. 4C there are no tabs displayed for source code operations such as C/C++ or MATLAB since the model did not contain any DBOs necessitating the creation of such views.

Figure 5A:
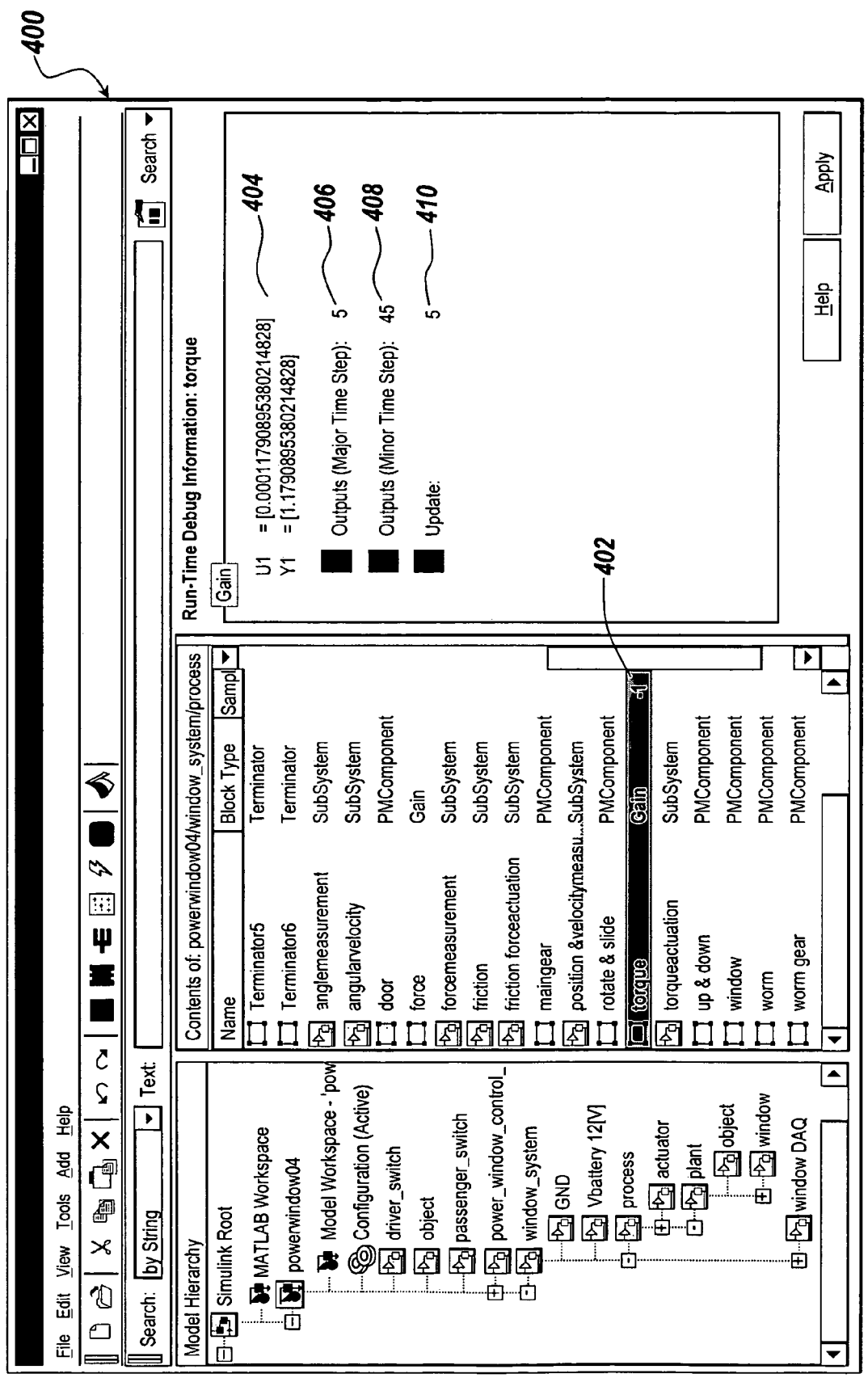
Figure 5B:
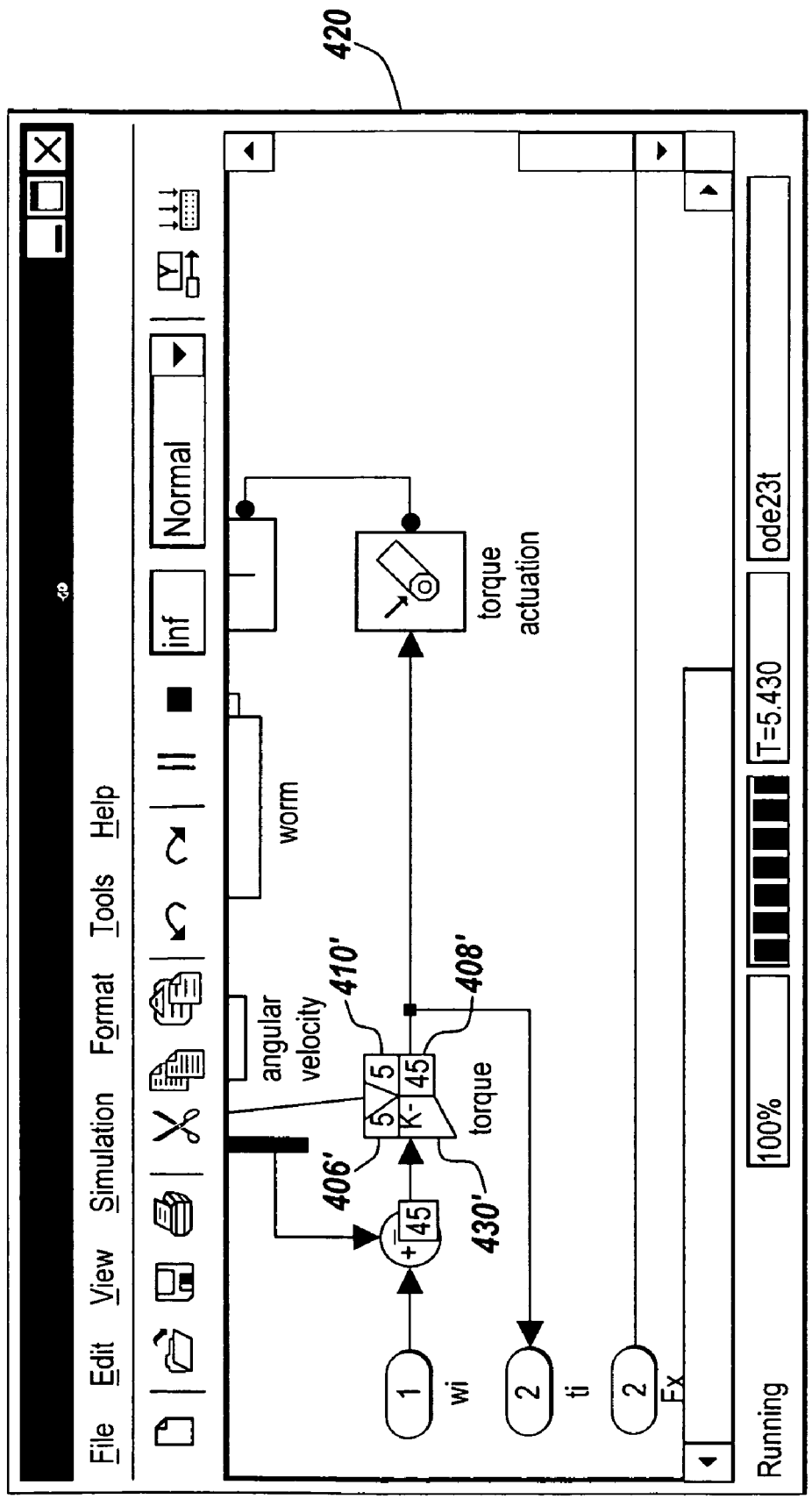

The Unified Debugger 200 synchronizes the values found in the different views as depicted in FIG. 5A. The model explorer view 400 displays debugging information 404 from the currently executing output method of the torque block 402. The debug information indicates the point in the current execution and indicates that there have been 5 major time steps 406, 45 minor time steps 408, and 5 updates 410 during the execution of the outputs method of the torque block. Major and minor time steps are used during simulation of models with continuous states by solvers. The minor time step is a subdivision of the major time step and is used to improve the accuracy of the major time step. A result is produced at the conclusion of each major time step. This debug information is synchronized in other views so that when the model view of the block diagram model is displayed, the debug information is shown in the model 420. FIG. 5B shows a model view which includes the torque block 430. The Unified Debugger superimposes the debug information 406', 408' and 410' corresponding to the debug information 404, shown in FIG. 5A. To the degree that the information is relevant in multiple views, the information is synchronized and displayed for the user in the alternate views. Those skilled in the art will recognize that some information that is displayed in some modeling domains is domain specific and therefore is not displayed in views of other modeling domains.

Figure 6A:
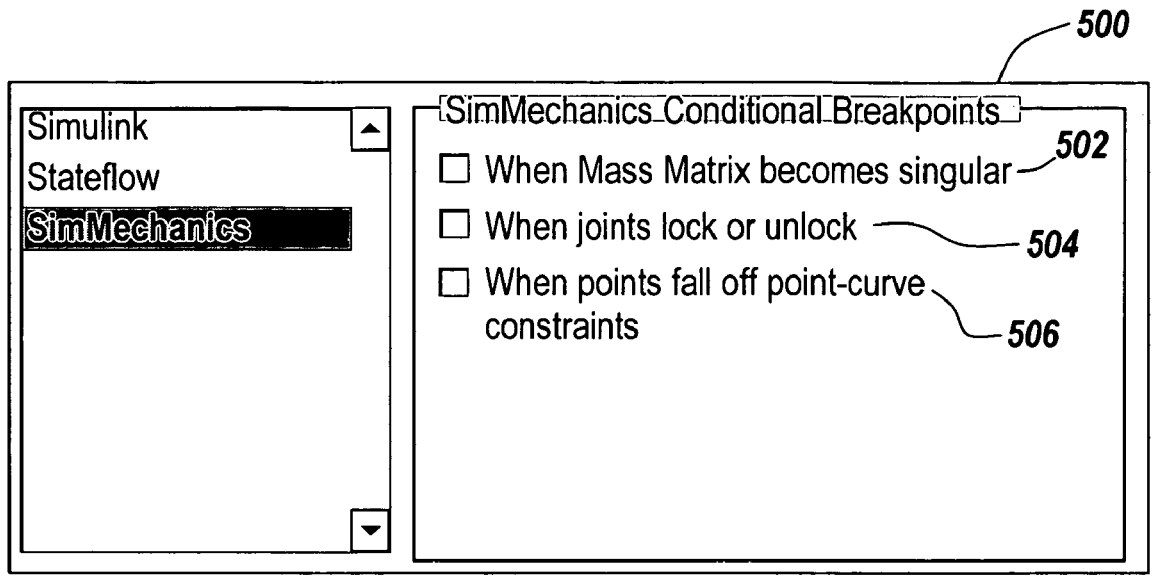
FIG. 6A depicts a user interface allowing graphical object specification information to be customized for a physical modeling domain.
Figure 6B:
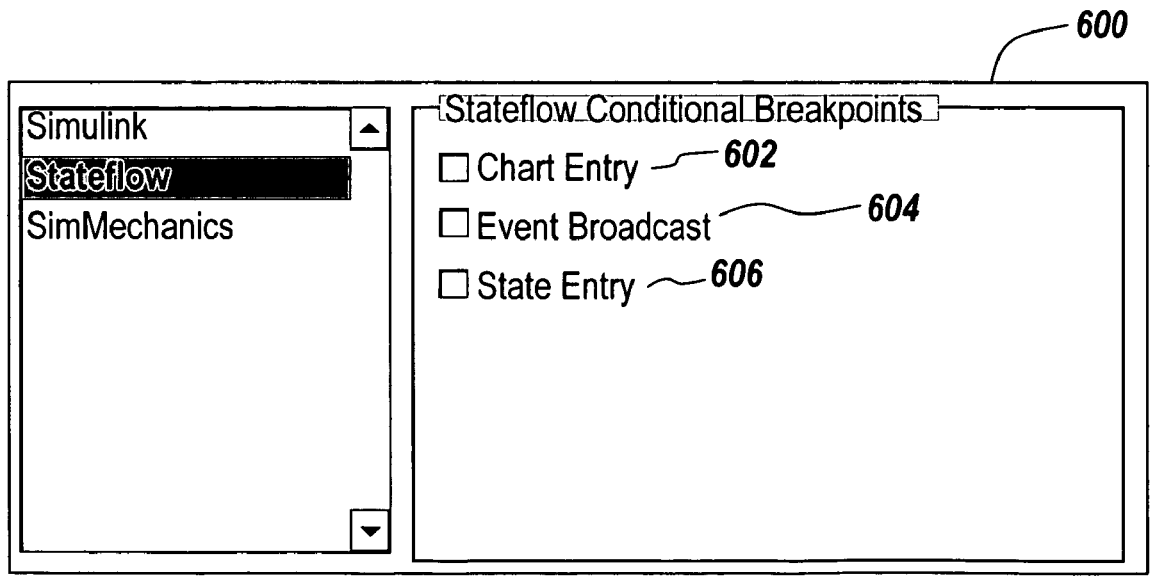
FIG. 6B depicts a user interface allowing graphical object specification information to be customized for a statechart modeling domain.

The illustrative embodiment of the present invention allows the Unified Debugger to display per graphical object specification information that is customized based on user choices for different modeling domains or DBOs. FIG. 6A shows available conditional break points that may be set for SIMMECHANICS DBOs. The user interface 500 indicates that breakpoints may be registered for points where mass matrices become singular 502, when joints lock or unlock 504, and when points fall off the point curve constraints 506 during execution of the SIMMECHANICS model. Similarly in FIG. 6B a user interface 600 for the STATEFLOW environment allows STATEFLOW conditional breakpoints to be set for chart entry 602, event broadcast 604 and state entries 606.

Figure 7:
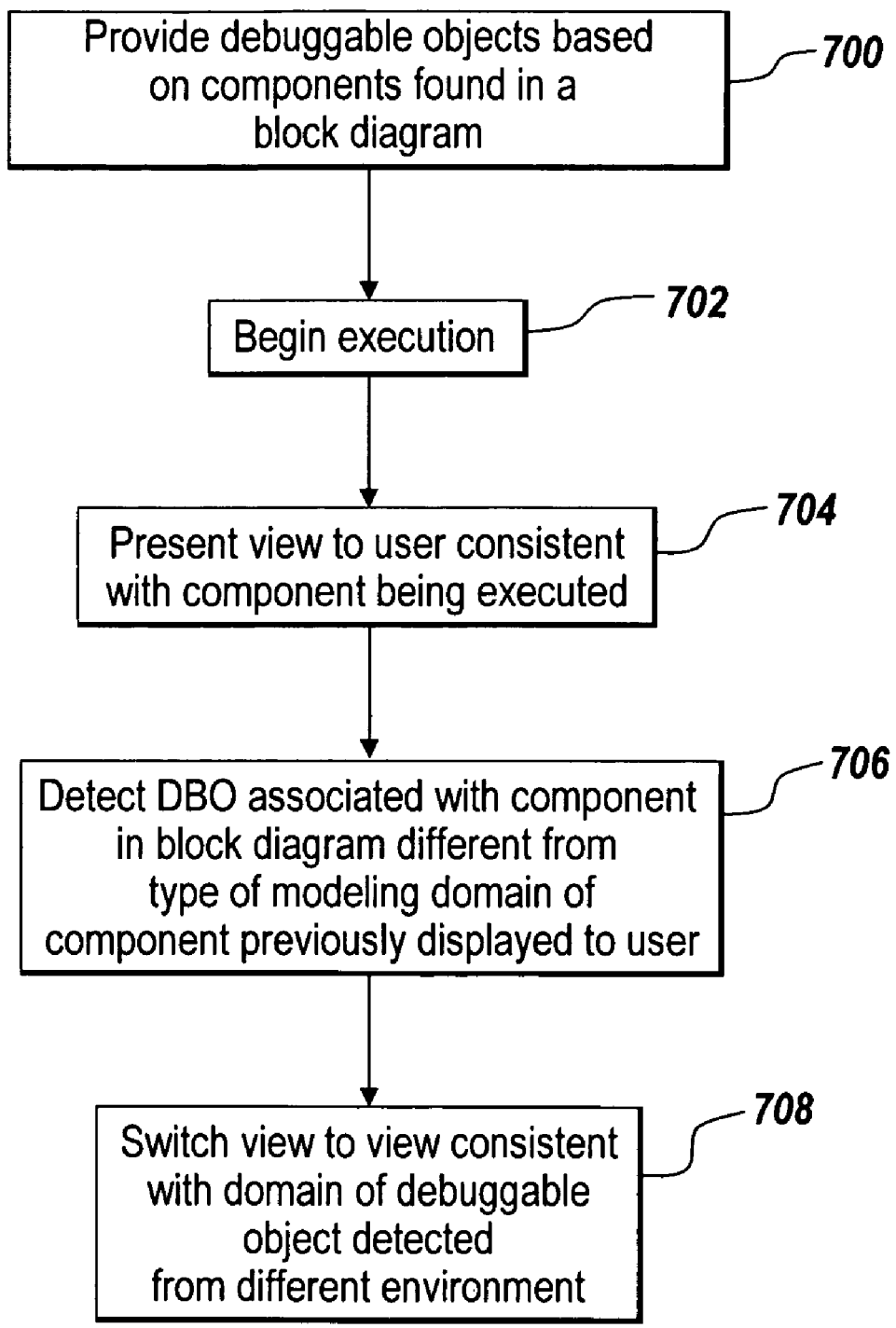
FIG. 7 is a flow chart of the sequence of steps followed by the illustrative embodiment of the present invention to debug a block diagram model with entities from different modeling domains.

FIG. 7 depicts the sequence of steps followed by the illustrative embodiment of the present invention to utilize the Unified Debugger to debug block diagram model entities from different modeling domains. The sequence begins when DBOs in the block diagram model are registered with the Unified Debugger during initialization of the execution (step 700). Subsequent to the registering of the DBOs, the execution of the block diagram model begins (step 702). The user is presented a displayed view that is consistent with the modeling domain of the entity that is currently being executed (step 704). In other words, if a time-based block diagram block is being executed, a time-based block diagram view is presented to the user. If the execution encounters a DBO for an entity indicating a statechart, a statechart view is displayed to the user. Similarly, DBOs indicating computer code or physical system modeling domains cause views consistent with those domains to be displayed to the user. Subsequently during the execution, the Unified Debugger encounters a DBO associated with an entity in the block diagram from a different modeling domain than the modeling domain of an entity currently being displayed to the user (step 706). Based on the detection of the DBO based on an entity from a different modeling domain, the Unified Debugger utilizes debugging features appropriate for the new modeling domain and the view is switched to a view consistent with the entity from the newly detected domain (step 708). For example, a time-based block diagram model being executed may display a time-based block diagram view to a user until such time as a step being executed causes a statechart to be entered. At that point, the Unified Debugger automatically switches to statechart debugging features and displays a statechart view to the user. The other views remain available to the user who is able to manually switch back at any time to one of the other views. As discussed above, the output data from the execution in the various views is synchronized.

The present invention may be provided as one or more computer-readable programs embodied on or in one or more mediums. The mediums may be a floppy disk, a hard disk, a compact disc, a digital versatile disc, a flash memory card, a PROM, a RAM, a ROM, or a magnetic tape. In general, the computer-readable programs may be implemented in any programming language. Some examples of languages that can be used include C, C++, C#, or JAVA. The software programs may be stored on or in one or more mediums as object code.

The illustrative embodiment has been described above for illustrative purposes relative to the technical computing environment of MATLAB and SIMULINK from The MathWorks, Inc. of Natick, Mass. Although the illustrative embodiment has been described relative to a MathWorks-based application, one of ordinary skill in the art will appreciate that the present invention may be applied to other graphical modeling environments and technical computing environments, such as any technical computing environments using software products of LabVIEW®, MATRIXx from National Instruments, Inc., Mathematica® from Wolfram Research, Inc., Mathcad of Mathsoft Engineering & Education Inc., Dymola from Dynasim AB, or Maple™ from Maplesoft, a division of Waterloo Maple Inc. Furthermore, one ordinarily skilled in the art will appreciate that the present invention may apply to any graphical modeling environment, such as one providing modeling with a Unified Modeling Language (UML), Hardware Description Language (HDL), or that provides a physics modeling domain.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

We claim:

1. A system for debugging a multi-domain graphical model, comprising: a computational device, having:
   a plurality of debuggable objects respectively associated with at least one of a plurality of entities found in a graphical model, the plurality of entities including entities from modeling domains of different types; and
   a unified debugger, the unified debugger integrating a plurality of the debuggable objects that are associated with entities from the modeling domains into a common diagnostic environment, the unified debugger generating a view of information based on information referenced by a debuggable object being executed in the graphical model; and
   a display device configured to display a view of information associated with an executing one of the plurality of entities in the graphical model, the view automatically changing as entities from different types of modeling domains are executed in the graphical model, the changing view based on information in a debuggable object associated with a currently executing entity in the graphical model, the view changing between views of at least two of a time-based block diagram, a statechart, a data flow diagram, a discrete event model and compiled code.

2. The system of claim 1 wherein the unified debugger further comprises:
   a debugger engine for debugging the graphical model and communicating with the plurality of debuggable objects,
   a plurality of debugger views for displaying debug information to a user, and
   a debugger view controller for determining how information referenced by the debuggable objects is displayed to the user.

3. The system of claim 2 wherein the plurality of debugger views include at least one of a model view displaying a graphical representation of the graphical model, a debugging view displaying debug information, and a model explorer view showing a hierarchical display of information associated with elements in the graphical model.

4. The system of claim 1 wherein the plurality of modeling domains include at least two of a time-based block diagram domain, a statechart domain, a data flow diagram domain, a compiled code domain, a discrete event modeling domain and a physical system modeling domain.

5. The system of claim 1 wherein the common diagnostic environment is used to debug at least two of a time-based block diagram, a statechart, a data flow diagram, a discrete event model, a physical system model and compiled code.

6. The system of claim 1 wherein the debug information is provided to a user in a non-visual format.

7. In a computational device with a block diagram environment, a method of debugging a multi-domain block diagram, the method comprising: providing a plurality of debuggable objects (DBOs) associated with entities found in a block diagram model and its solver, the block diagram model including entities from a plurality of types of modeling domains, the modeling domains being of different types;
   providing a unified debugger, the unified debugger integrating the plurality of DBOS that are associated with entities from different types of modeling domains into a common diagnostic environment, the common diagnostic environment displaying a plurality of views of the block diagram to a user consistent with a modeling domain of an entity being executed;
   executing a first entity from a first modeling domain in the block diagram;
   displaying a first view consistent with the first modeling domain in the common diagnostic environment, the displaying of the first view based on information referenced by a first DBO associated with the first entity;
   executing a second entity from a second modeling domain in the block diagram;
   replacing the first view with a second view consistent with the second modeling domain in the common diagnostic environment, the view changing between views of at least two of a time-based block diagram, a statechart, a data flow diagram, a discrete event model and compiled code; and
   displaying the second view based on information referenced by a second DBO associated with the second executing entity.

8. The method of claim 7, comprising further:
   synchronizing at least two data values displayed in the plurality of views to reflect the results of the execution of the block diagram.

9. The method of claim 7 wherein the plurality of modeling domains include at least two of a time-based block diagram domain, a statechart domain, a discrete event modeling domain, a data flow diagram domain, a compiled code domain and a physical system modeling domain.

10. The method of claim 7, further comprising:
    providing a graphical object associated with a DBO.

11. The method of claim 10 wherein the graphical object includes a schema indicating how data associated with the entity associated with the DBO should be displayed by the unified debugger.

12. The method of claim 11, further comprising:
    providing a view controller, the view controller communicating with the graphical object prior to the unified debugger displaying the plurality of views.

13. The method of claim 7, further comprising:
    registering at least one method in a DBO with the unified debugger.

14. The method of claim 7, further comprising:
    registering at least one domain specific event with the unified debugger.

15. The method of claim 14 wherein the domain specific event is one of division by zero in a solver, a zero crossing, a negative square root and an inconsistent state transition.

16. The method of claim 7, further comprising:
    registering at least one DBO specific command with the unified debugger.

17. The method of claim 7 wherein a DBO informs the unified debugger of a currently executing method.

18. The method of claim 7, further comprising:
    transmitting a communication from a first DBO registered with the unified debugger to a second DBO registered with the unified debugger.

19. The method of claim 7, further comprising:
exposing a collection of data in an entity being executed in the block diagram to a user, the collection of data being sent from a DBO associated with the entity to the unified debugger in response to a request, the unified debugger generating a display of the data to the user.

20. The method of claim 7, further comprising:
displaying debug information from the execution of an entity in the block diagram based on a schema associated with a DBO of the entity.

21. The method of claim 7 wherein the common diagnostic environment displays profiling information to a user.

22. The method of claim 7 wherein the user selects which of the plurality of views to display.

23. A computer-readable medium holding computer executable instructions for debugging a multi-domain block diagram, the instructions comprising:
one or more instructions for providing a plurality of debuggable objects (DBOs) associated with entities found in a block diagram model and its solver, the block diagram model including entities from a plurality of different types of modeling domains, the modeling domains being of different types;
one or more instructions for providing a unified debugger, the unified debugger integrating the plurality of DBOs that are associated with entities from different types of modeling domains for debugging into a common diagnostic environment, the common diagnostic environment displaying a plurality of views of the block diagram to a user consistent with a modeling domain of an entity being executed;
one or more instructions for executing a first entity from a first modeling domain in the block diagram;
one or more instructions for displaying a first view consistent with the first modeling domain in the common diagnostic environment, the displaying of the first view based on information referenced by a first DBO associated with the first entity;
one or more instructions for executing a second entity from a second modeling domain in the block diagram;
one or more instructions for replacing the first view with a second view consistent with the second modeling domain in the common diagnostic environment, the view changing between views of at least two of a time-based block diagram, a statechart, a data flow diagram, a discrete event model and compiled code; and
one or more instructions for displaying the second view based on information referenced by a second DBO associated with the executing second entity.

24. The medium of claim 23 wherein the instructions further comprise:
one or more instructions for synchronizing at least two data values displayed in the plurality of views to reflect the results of the execution.

25. The medium of claim 23 wherein the plurality of modeling domains include at least two of a time-based block diagram domain, a statechart domain, a data flow diagram domain, a discrete event modeling domain, a compiled code domain and physical system model domain.

26. The medium of claim 23 wherein the instructions further comprise:
one or more instructions for providing a graphical object associated with a DBO.

27. The medium of claim 26 wherein the graphical object includes a schema indicating how data associated with the entity associated with the DBO should be displayed by the unified debugger.

28. The medium of claim 27 wherein the instructions further comprise:
one or more instructions for providing a view controller, the view controller communicating with the graphical object prior to the unified debugger displaying the plurality of views.

29. The medium of claim 23 wherein the instructions further comprise:
one or more instructions for registering at least one method in a DBO with the unified debugger.

30. The medium of claim 23 wherein the instructions further comprise:
one or more instructions for registering at least one domain specific event with the unified debugger.

31. The medium of claim 30 wherein the domain specific event includes one of a division by zero in a solver, a zero crossing, a negative square root and an inconsistent state transition.

32. The medium of claim 23 wherein the instructions further comprise:
one or more instructions for registering at least one DBO specific command with the unified debugger.

33. The medium of claim 23 wherein a DBO informs the unified debugger of a currently executing method.

34. The medium of claim 23 wherein the instructions further comprise:
one of more instructions for transmitting a communication from a first DBO registered with the unified debugger to a second DBO registered with the unified debugger.

35. The medium of claim 23 wherein the instructions further comprise:
one or more instructions for exposing a collection of data in an entity being executed in the block diagram to a user, the collection of data being sent from a DBO associated with the entity to the unified debugger in response to a request, the unified debugger generating a display of the data to the user.

36. The medium of claim 23 wherein the instructions further comprise:
one or more instructions for displaying debug information from the execution of an entity in the block diagram based on a schema associated with a DBO of the entity.

37. The medium of claim 23 wherein the common diagnostic environment displays profiling information to a user.

38. A distributed system for debugging multi-domain block diagrams, comprising:
a server hosting a block diagram environment having at least one block diagram model, the block diagram model including entities from a plurality of modeling domains, the modeling domains being of different types, the entities in the at least one block diagram model associated with a respective one of a plurality of debuggable objects (DBOs), DBO the block diagram environment including a unified debugger, the unified debugger integrating the plurality of DBOs that are associated with entities from different types of modeling domains into a common diagnostic environment for a user, the common diagnostic environment generating a plurality of views of the block diagram to the user;
a client device configured to communicate with the server over a network, the client device requesting the initiation of an execution of the block diagram model in response to a user request; and
a display device configured to communicate with the client device, the display device displaying the plurality of views generated by the server during an execution of the block diagram model, the plurality of views programmatically transitioning from a first view consistent with the first modeling domain to a second view consistent with a second modeling domain, the displaying of the first and second view based on information referenced by a first DBO and a second DBO associated with a first entity and a second entity, respectively, the transitioning between views of at least two of a time-based block diagram, a statechart, a data flow diagram, a discrete event model and compiled code.

39. A computer-readable medium holding computer-executable instructions for debugging a graphical model, the instructions comprising:
- one or more instructions for providing a model view of a graphical model being executed, the model view showing a plurality of entities from a plurality of different types of modeling domains and transitioning between views of at least two of a time-based block diagram, a statechart, a data flow diagram, a discrete event model and compiled code; and,
- one or more instructions for providing a plurality of debuggable objects (DBOs) associated with the plurality of entities found in the graphical model and a solver for the graphical model, the graphical model including entities from a plurality of modeling domains, the modeling domains being of different types;
- one or more instructions for generating an execution list view displaying information from the execution of the entities in the graphical model; and
- one or more instructions for integrating the model view, a plurality of DBOs that are associated with entities from different types of modeling domains, and the execution list view into a common diagnostic environment, the common diagnostic environment including a unified debugger for the plurality of modeling domain.

40. The medium of claim 39, wherein the instructions further comprise:
- one or more instructions for registering at least one method in a DBO with the unified debugger.

41. The medium of claim 39, wherein the instructions further comprise:
- one or more instructions for registering at least one domain specific event with the unified debugger.

42. The medium of claim 39, wherein the instructions further comprise:
- one or more instructions for registering at least one domain DBO specific command with the unified debugger prior to the execution of the graphical model.

43. The medium of claim 39 wherein a DBO informs the unified debugger of a currently executing method.

44. The medium of claim 39, wherein the instructions further comprise: one or more instructions for transmitting a communication from a first DBO registered with the unified debugger to a second DBO registered with the unified debugger.

45. The medium of claim 39, wherein the instructions further comprise:
- one or more instructions for exposing a collection of data in an entity being executed in the graphical model to a user, the collection of data being sent from a DBO associated with the entity to the unified debugger in response to a request, the unified debugger generating a display of the data to the user.

46. The medium of claim 39, wherein the instructions further comprise:
- one or more instructions for displaying debug information from the execution of an entity in the graphical model based on a schema associated with a DBO of the entity.

47. The medium of claim 39, wherein the common diagnostic environment displays profiling information to a user.

48. In a computational device with a graphical modeling environment, a method of debugging a multi-domain graphical model, the method comprising:
- providing a standard interface for a plurality of entities found in a graphical model and its solver, the graphical model including entities from a plurality of different types of modeling domains;
- providing a unified debugger, the unified debugger integrating information acquired for debugging the plurality of entities from different types of modeling domains into a common diagnostic environment for a user, the information acquired using a standard interface, the common diagnostic environment displaying a plurality of views of the graphical model to a user consistent with the modeling domain of an entity being executed, the plurality of views transitioning between views of at least two of a time-based block diagram, a statechart, a data flow diagram, a discrete event model and compiled code; and
- executing the graphical model, the unified debugger providing a view of the execution to the user that automatically changes as entities from different types of modeling domains are executed in the graphical model, the changing of the view based on information associated with a currently executing entity in the graphical model.

* * * * *

UNITED STATES PATENT AND TRADEMARK OFFICE
CERTIFICATE OF CORRECTION

PATENT NO. : 7,496,895 B1
APPLICATION NO. : 11/025218
DATED : February 24, 2009
INVENTOR(S) : Pieter J. Mosterman et al.

It is certified that error appears in the above-identified patent and that said Letters Patent is hereby corrected as shown below:

At column 3, line 58 "model," should be --model;--.

At column 8, line 61 "include" should be --includes--.

At column 10, line 34 "are" should be --is--.

At column 10, line 37 "include" should be --includes--.

Signed and Sealed this

Fifth Day of May, 2009

JOHN DOLL
*Acting Director of the United States Patent and Trademark Office*